(12) United States Patent
Toy et al.

(10) Patent No.: US 7,966,001 B2
(45) Date of Patent: *Jun. 21, 2011

(54) SYSTEMS AND METHODS FOR CONFIGURATION OF MOBILE COMPUTING DEVICES

(75) Inventors: Andrew Jong Kein Toy, New York, NY (US); Bruce Alexander Zenel, Brooklyn, NY (US); John Roussochatzakis, Hastings-on-Hudson, NY (US)

(73) Assignee: Morgan Stanley, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/748,018

(22) Filed: Mar. 26, 2010

(65) Prior Publication Data

US 2010/0178899 A1    Jul. 15, 2010

Related U.S. Application Data

(63) Continuation of application No. 11/317,719, filed on Dec. 23, 2005, now Pat. No. 7,689,205.

(51) Int. Cl.
    *H04M 1/66* (2006.01)

(52) U.S. Cl. ..... 455/411; 455/418; 455/420; 455/556.2; 455/558; 709/203; 709/217; 380/247

(58) Field of Classification Search ......... 455/410–411, 455/419–420; 709/203–206, 217; 380/247; 713/168–171

See application file for complete search history.

(56) References Cited

U.S. PATENT DOCUMENTS

| | | | |
|---|---|---|---|
| 5,371,794 | A | 12/1994 | Diffie et al. |
| 5,418,837 | A | 5/1995 | Johansson et al. |
| 5,444,764 | A | 8/1995 | Galecki |
| 5,864,297 | A | 1/1999 | Sollestre et al. |
| 5,875,404 | A | 2/1999 | Messiet |
| 6,138,009 | A | 10/2000 | Birgerson |
| 6,170,057 | B1 | 1/2001 | Inoue et al. |
| 6,480,725 | B2 | 11/2002 | Cassidy et al. |
| 6,484,022 | B1 | 11/2002 | Findikli et al. |
| 6,771,954 | B1 | 8/2004 | Yoneyama et al. |
| 6,778,828 | B1 | 8/2004 | Chander et al. |
| 6,826,401 | B1 | 11/2004 | Morvan et al. |
| 6,859,650 | B1 | 2/2005 | Ritter |
| 6,944,478 | B1 | 9/2005 | Durand |
| 7,181,196 | B2 * | 2/2007 | Patel ............................. 455/411 |
| 7,299,037 | B2 | 11/2007 | Hospes |
| 7,313,825 | B2 | 12/2007 | Redlich et al. |
| 7,363,363 | B2 | 4/2008 | Dal Canto et al. |
| 7,363,540 | B2 | 4/2008 | Patel et al. |

(Continued)

FOREIGN PATENT DOCUMENTS

EP    0884916 A2    12/1998

(Continued)

OTHER PUBLICATIONS

European Patent Application No. EP06123381.3, European Search Report dated Jul. 22, 2008, (6 pages).

(Continued)

*Primary Examiner* — Sharad Rampuria
(74) *Attorney, Agent, or Firm* — K&L Gates LLP

(57) ABSTRACT

A system including a handheld mobile computing device and an external storage medium in communication with the mobile computing device, the storage medium having stored thereon preconfigured user information and security information.

20 Claims, 6 Drawing Sheets

U.S. PATENT DOCUMENTS

| | | | |
|---|---|---|---|
| 7,406,334 B2 | 7/2008 | Liu | |
| 7,519,360 B2 | 4/2009 | Maeda et al. | |
| 7,565,135 B2 * | 7/2009 | Patel | 455/411 |
| 7,603,435 B2 * | 10/2009 | Welingkar et al. | 709/217 |
| 7,689,205 B2 * | 3/2010 | Toy et al. | 455/411 |
| 7,734,285 B2 | 6/2010 | Chmaytelli et al. | |
| 7,796,975 B2 | 9/2010 | Goss | |
| 2003/0088781 A1 | 5/2003 | ShamRao | |
| 2003/0097350 A1 | 5/2003 | ShamRao | |
| 2004/0177270 A1 | 9/2004 | Little et al. | |
| 2005/0091346 A1 | 4/2005 | Krishnaswami et al. | |
| 2005/0136884 A1 | 6/2005 | Reidelsturz et al. | |
| 2008/0014990 A1 | 1/2008 | Jain et al. | |
| 2008/0114855 A1 * | 5/2008 | Welingkar et al. | 709/217 |
| 2008/0280644 A1 * | 11/2008 | Hugot | 455/556.2 |
| 2009/0150970 A1 * | 6/2009 | Hinds et al. | 726/1 |
| 2010/0279652 A1 * | 11/2010 | Sharp et al. | 455/410 |
| 2010/0311402 A1 * | 12/2010 | Srinivasan et al. | 455/418 |

FOREIGN PATENT DOCUMENTS

| | | |
|---|---|---|
| WO | WO 93/07697 A1 | 4/1993 |
| WO | WO 00/49505 A1 | 8/2000 |
| WO | WO 00/67097 A1 | 11/2000 |
| WO | WO 03/100583 A1 | 12/2003 |

OTHER PUBLICATIONS

Tsai, Yuh-Ren, et al., "SIM-based Subscriber Authentication for Wireless Local Area Networks", Proceedings of 37$^{th}$ Annual 2003 International Carnahan Conference on Security Technology, (ICCST), Tapei, Taiwan, Oct. 14-16, 2003; New York, NY, vol. Conf. 37, Oct. 14, 2003, pp. 468-473.

European Search Report dated Mar. 4, 2011 for European Patent Application No. EP11154011.8 (9 pages).

* cited by examiner

SYSTEMS AND METHODS FOR CONFIGURATION OF MOBILE COMPUTING DEVICES

CROSS REFERENCE TO RELATED APPLICATIONS

The present patent application is a continuation of copending U.S. patent application Ser. No. 11/317,719, entitled "SYSTEMS AND METHODS FOR CONFIGURATION OF MOBILE COMPUTING DEVICES," filed on Dec. 23, 2005, the entirety of which is incorporated by reference.

BACKGROUND

Mobile computing devices such as, for example, personal digital assistants (PDAs), wireless laptops, mobile phones, and wearable computers often utilize mobile computing operating systems that have various disadvantages. For example, such operating systems typically use volatile memory as a persistent storage mechanism. Such a mechanism may result in the loss of state of a mobile device when device power is lost (i.e., the batteries weaken or lose their charge and the device reverts to its factory settings). Also, mobile computing operating systems typically lack authentication and encryption functions, and thus such functions have to be programmed at the application layer. Furthermore, mobile computing operating systems typically lack sophistication and thus customization and configuration of mobile devices must be performed often through provisioning and re-provisioning of the devices. Programmed authentication and encryption functions and customized programming are often expensive to implement and, when mobile devices lose power, such functions and programming may be lost.

SUMMARY

In various embodiments, the present invention is directed to a system including a handheld mobile computing device and an external storage medium in communication with the mobile computing device, the storage medium having stored thereon preconfigured user information and security information.

In various embodiments, the present invention is directed to a system. The system includes a mobile device that includes a device wipe module, an installation module, a device security verification module, a core runtime agent, a message verification module, and a card integrity verification module. The system also includes a computer in communication with the mobile device. The computer includes a configuration generator, a profile generator, and a writing module for storing preconfigured user information and security information onto an external storage medium of the mobile device.

In various embodiments, the present invention is directed to a method of facilitating operation of a mobile device that is in communication with a server. The method includes loading on the mobile device, from an external storage medium, a profile having preconfigured user information and security information. The method also includes connecting to a wireless network and performing an action when directed by the server.

In various embodiments, the present invention is directed to a method of pre-configuring user information and security information for a mobile device. The method includes requesting a username from a user of the mobile device, generating the user information and security information for the user, and storing the user information and security information on an external storage medium for use with the mobile device.

In various embodiments, the present invention is directed to an apparatus. The apparatus includes means for loading on a mobile device, from an external storage medium, a profile having preconfigured user information and security information, means for connecting to a wireless network, and means for performing an action when directed by a server.

In various embodiments, the present invention is directed to a computer readable medium having stored thereon instructions which, when executed by a processor, cause the processor to:
load on a mobile device, from an external storage medium, a profile having preconfigured user information and security information;
connect to a wireless network; and
perform an action when directed by a server.

DESCRIPTION

As used herein, the term "mobile computing device" includes any type of mobile device such as, for example, personal digital assistants (PDAs), wireless laptops, mobile phones, wearable computers, etc. Such devices may employ any type of mobile computing operating system such as, for example, the Palm OS operating system, the Windows Mobile® operating system, the Blackberry® operating system, Linux-based operating systems, the Symbian® operating system, etc. A "handheld mobile computing device" is any type of mobile computing device that is portable and are held in the hand or are designed to be operated while being held in the hand.

Figure 1:
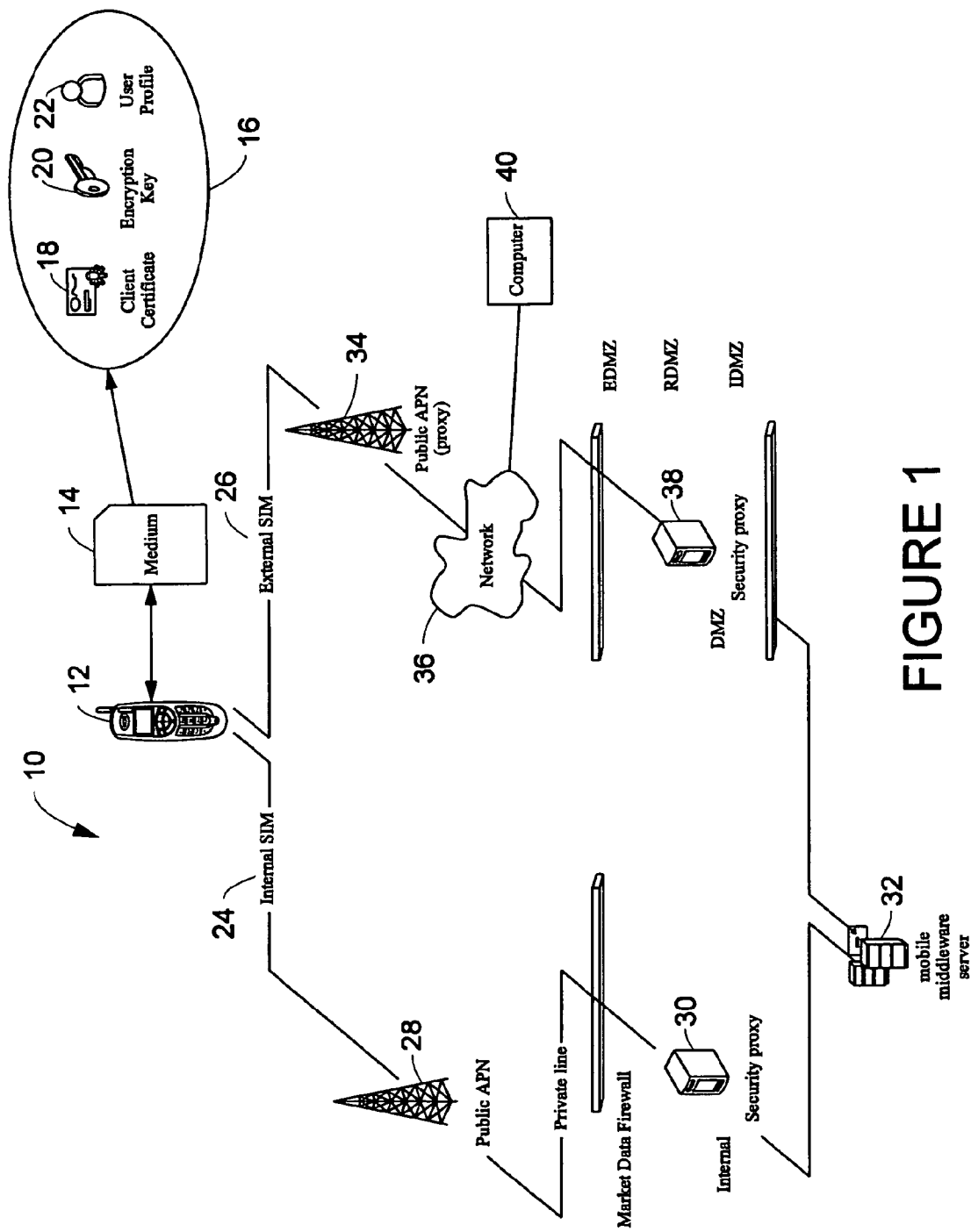
FIG. 1 illustrates an embodiment of a mobile computing system.

FIG. 1 illustrates an embodiment of a mobile computing system 10. The system 10 includes a mobile computing device 12 that may be in communication with an external storage medium 14. The medium 14 may be any type of medium such as, for example, a compact flash, data storage device that attaches to the mobile computing device 12. The medium 14 has stored thereon security and configuration information 16 that includes, for example, client certificates 18, an encryption key 20, and a user profile 22 that are used to enable the mobile computing device 12 to communicate with various components of the system 10. In various embodiments, the security and configuration information is preconfigured or pre-deployed by an enterprise. Such pre-configuration may be performed by, for example, a help desk in the enterprise or any appropriate third party.

The client certificate 18 and the encryption key 20 are examples of cryptographic information that may be stored on the medium 14 that allow the mobile computing device 12 to authenticate itself and secure network conversation. The user profile 22 may contain information that uniquely identifies the mobile computing device 12 and addressing information, such as servers/ports identification, which the mobile computing device 12 uses to connect to various components of the system 10.

The mobile computing device 12 is in communication with an internal security information management (SIM) system 24 and an external SIM system 26. A private access point network (APN) 28 uses, for example, leased lines and IP addressing to provide a simulated private wireless network. The private APN 28 is in communication with an internal security proxy server 30, which is in communication with a mobile middleware server 32. The mobile middleware server 32 may facilitate, for example, enterprise architecture integration.

A public APN 34 is in communication with, via a network 36 (e.g., the Internet) to a DMZ security proxy server 38, which is in communication with the mobile middleware server 32. The public APN 34 allows a user of the mobile computing device 12 to use a standard carrier APN when custom access credentials are presented by the mobile computing device 12. A user computer 40 may be in communication with the network 36 and may provide, for example, a desktop platform for which a user of the mobile computing device 12 may access various components of the system 10. The computer 40 may be, for example, a desktop or laptop personal computer.

Figure 2:
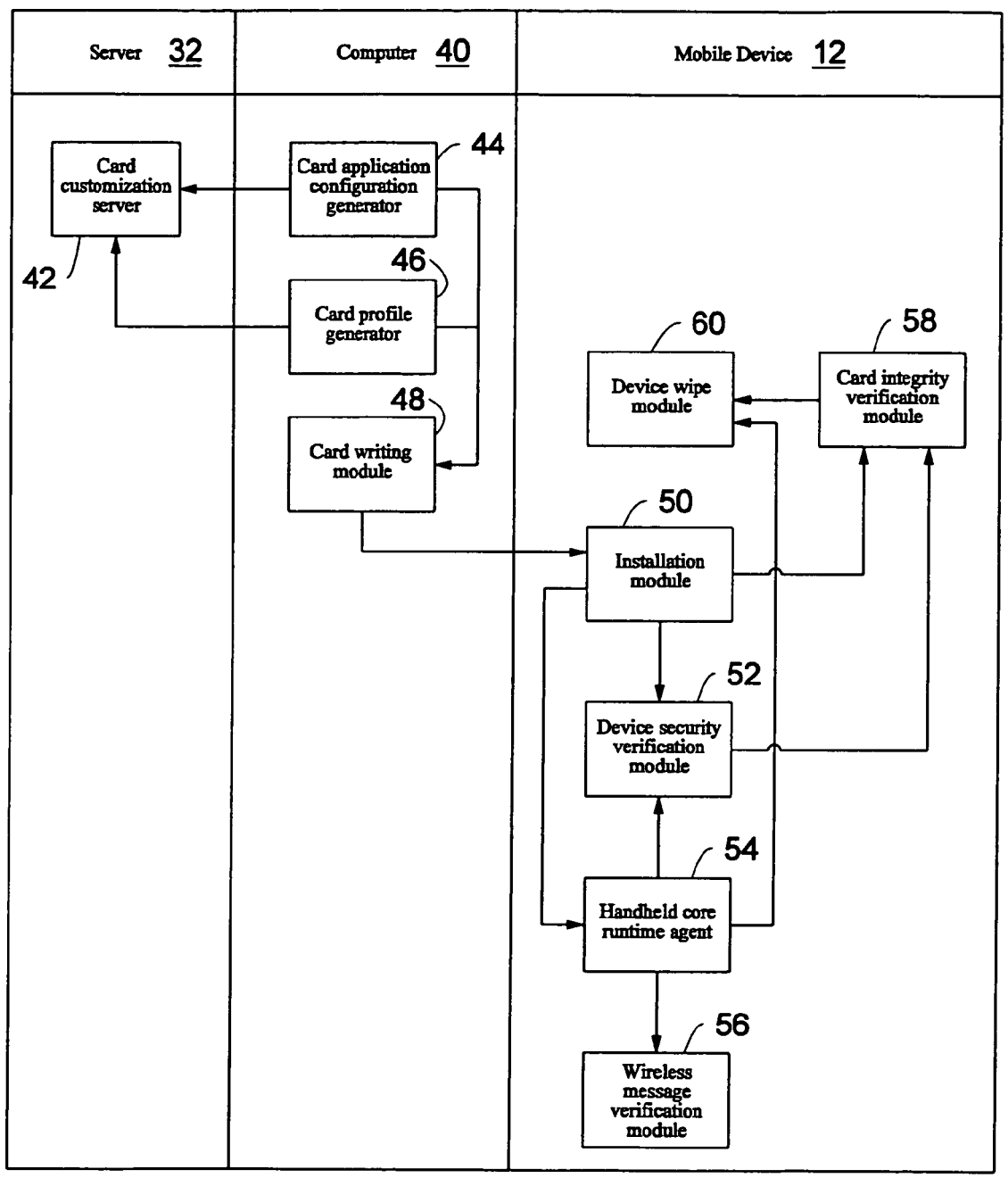
FIG. 2 illustrates an embodiment of various software modules resident on the system of FIG. 1.

FIG. 2 illustrates an embodiment of various software modules resident on the system 10 of FIG. 1. As illustrated in FIG. 2, a card customization server module 42 is resident on the mobile middleware server 32. The server module 42 may be invoked by a card application configuration generator module 44 and a card profile generator module 46 that are resident on the computer 40. The card application configuration generator module 44 assists a user of the mobile computing device 12 in configuring the medium 14 and the card profile generator module 46 assists a user of the device 12 in generating the user profile 22. The modules 44 and 46 may invoke a card writing module 48 that invokes an installation module 50 resident on the mobile computing device 12 to store the application configuration and the user profile 22 on the medium 14.

The installation module 50 may invoke a device security verification module 52, which in various embodiments uses a certificate-based cryptographic challenge and response system. In such embodiments, upon installation the user of the mobile computing device 12 is presented with a challenge string. The user then contacts a member of, for example, a help desk and receives a response to the challenge string, which must then be entered by the user. The installation module 50 may also invoke a handheld core runtime agent 54, which manages the runtime aspects of the device 12. The handheld core runtime agent 54 may invoke the device security verification module 52 and a wireless message verification module 56, which verifies the messages that are transmitted to and from the mobile computing device 12.

The device security verification module 52 may invoke a card integrity verification module 58 that verifies the integrity of the medium 14. The card integrity verification module 58 may also be invoked by the installation module 50. The card integrity verification module 58 may invoke a device wipe module 60. When the device wipe module 60 detects certain conditions, it may wipe out the settings (i.e., return the setting's to factory settings) of the mobile computing device 12. Such conditions may be, for example, when the device 12 is absent from the network for a predetermined period of time, when the medium 14 is absent from the device 12 for a predetermined period of time, etc. The device wipe module 60 may also be invoked by the handheld core runtime agent 54.

Figure 3:
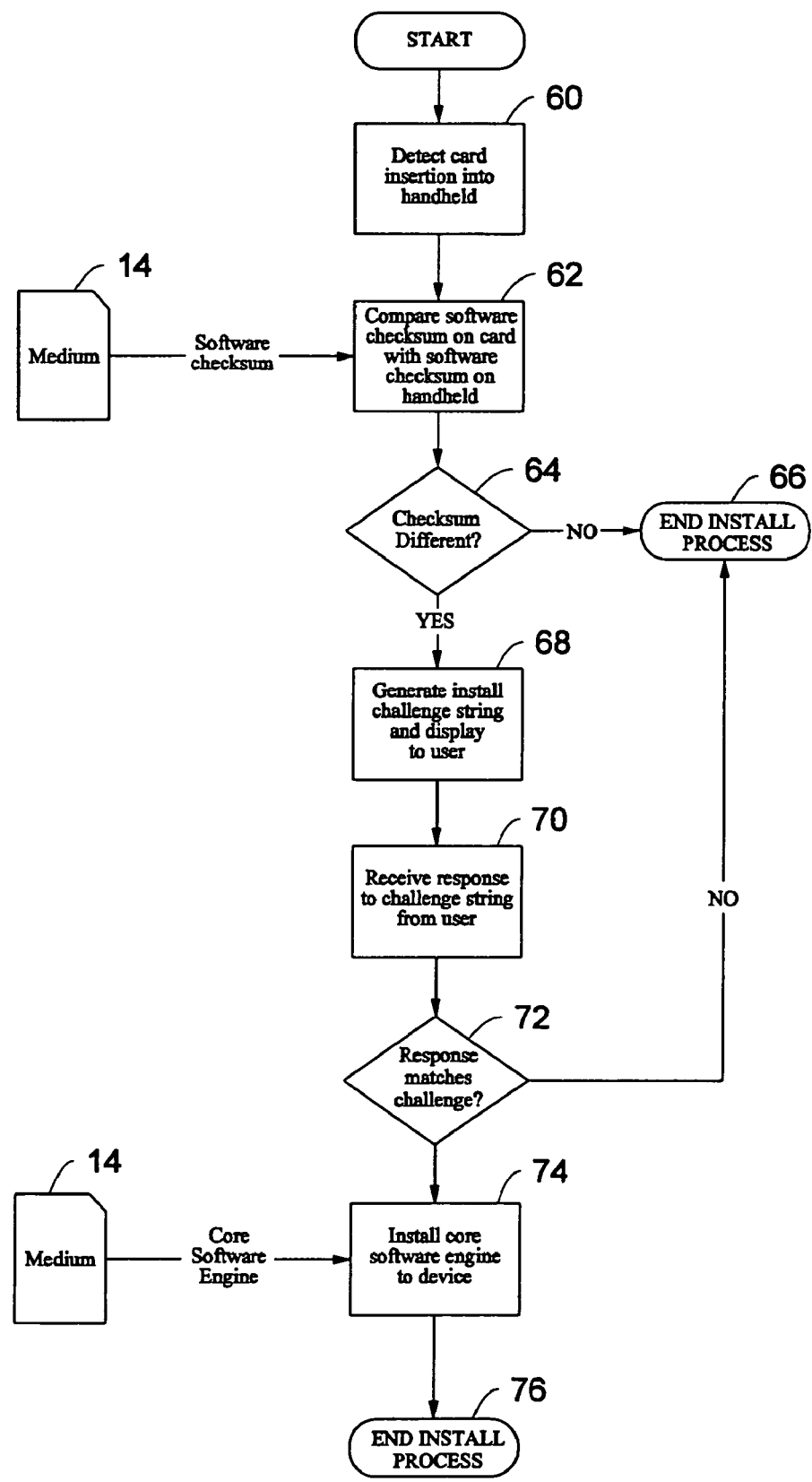
FIG. 3 illustrates an embodiment of a process for installing software on a mobile computing device.

FIG. 3 illustrates an embodiment of a process for installing software on the mobile computing device 12. The process starts at step 60, where the mobile computing device 12 detects that the medium 14 is inserted into the device 12. Insertion of the medium 14 triggers the installation process. At step 62 the software checksum of, for example, the core engine of the software on the medium 14 is compared with the checksum on the device 12. Such a step may be performed to ensure that the software engine on the device 12 is different from that on the medium 14. If at step 64 the checksum is determined to be the same, the process ends at 66.

If at step 64 the checksum is determined to be different, an install challenge string is generated and displayed to the user of the device 12. At step 70 a response to the challenge string is received from the user and, at step 72, it is determined whether the response matches the challenge. If the response did not match the challenge, the process ends at 66. If the response matched the challenge, the process advances to step 74, where the core software engine is installed on the device 12. In various embodiments, only core files are copied to the device 12, and profile information 22 and security information 18, 20 continue to reside on the medium 14.

Figure 4:
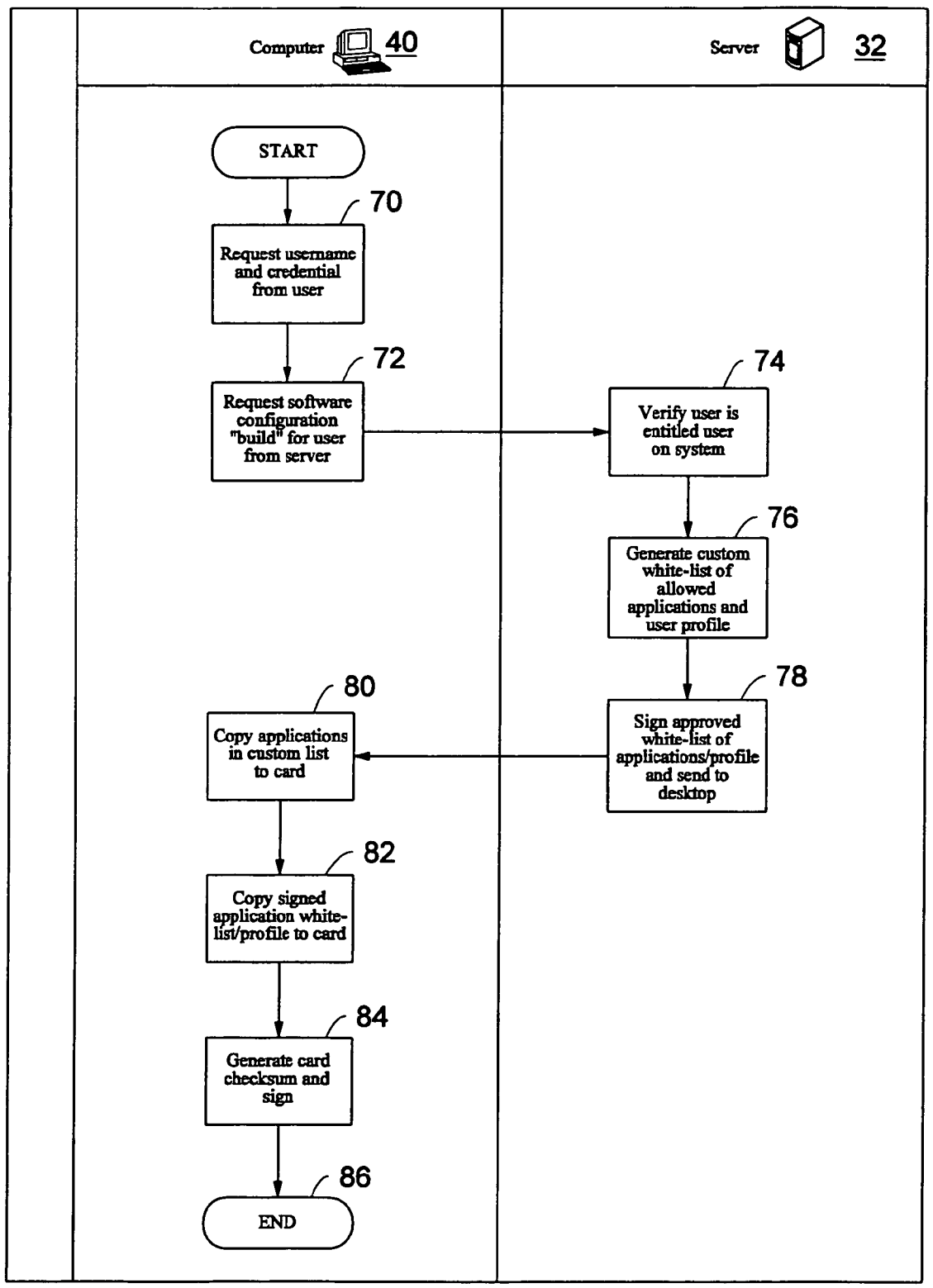
FIG. 4 illustrates an embodiment of a process for configuring a storage medium with software to be loaded on a mobile computing device.

FIG. 4 illustrates an embodiment of a process for configuring the storage medium 14 with software to be loaded on the mobile computing device 12. The process begins at step 70, where the computer 40 requests the user name and credentials from the user of the device 12. At step 72 the computer 40 requests the software configuration (i.e., the software build) from the server 32. At step 74 the server 32 verifies that the requesting user is an entitled user and at step 76 the server 32 generates a customer list of allowed applications and the user profile 22 for the user of the device 12. At step 78 the server 32 "signs" (i.e., approves) the list of applications and the profile and transmits them to the computer 40.

At step 80 the computer 40 copies applications in the list to the medium 14 and at step 82 the computer 32 copies signed application list and profile to the medium 14. At step 84 the computer 40 generates a checksum and at 86 the process ends.

Figure 5:
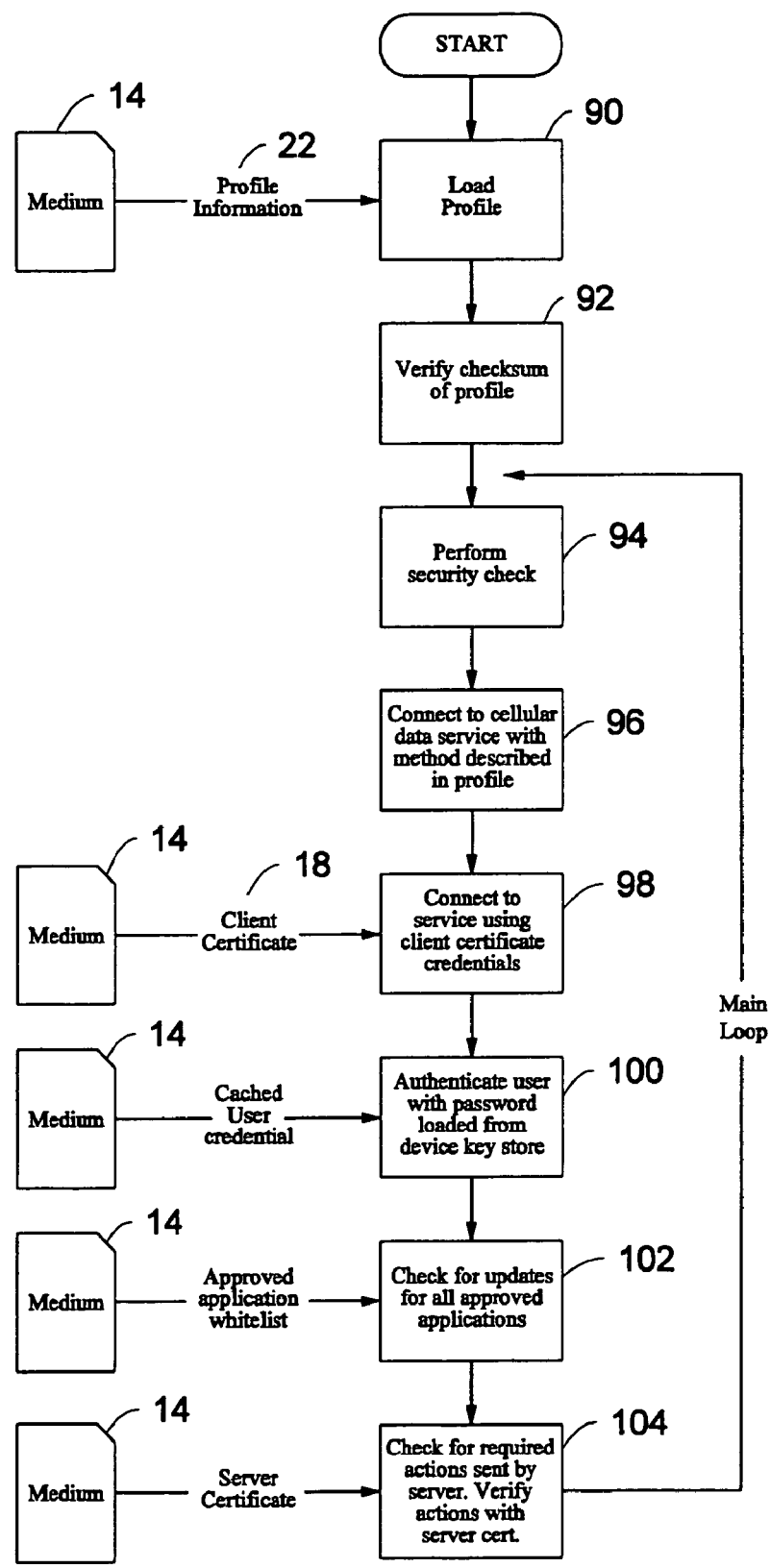
FIG. 5 illustrates an embodiment of a process for nominal operation of software loaded on a mobile computing device.

FIG. 5 illustrates an embodiment of a process for nominal operation of software loaded on the mobile computing device 12. At step 90 the profile 22 from the medium 14 is loaded so that the mobile computing device 12 can determine the identity of the user that is using the device 12 and the network and connectivity preferences of that user. At step 92 the checksum of the profile 22 is verified to ensure that the profile 22 has not been modified since it was received from the server 32 during configuration. At step 94 a security check is performed and at step 96 a connection is made to a cellular data service using the method described in the profile 22.

At step 98 the mobile computing device 12 is connected to the network using the certificate 18. At step 100 the user is authenticated with a password loaded from, for example, the key store of the device 12. At step 102 the process checks for updates for all approved applications, which may be "pushed" from the server 32. At step 104 the process checks for required actions sent by the server 32 and verifies that the actions have been "signed" by the server 32. The process continues to execute steps 94 through 104 during the operation of the mobile computing device 12.

Figure 6:
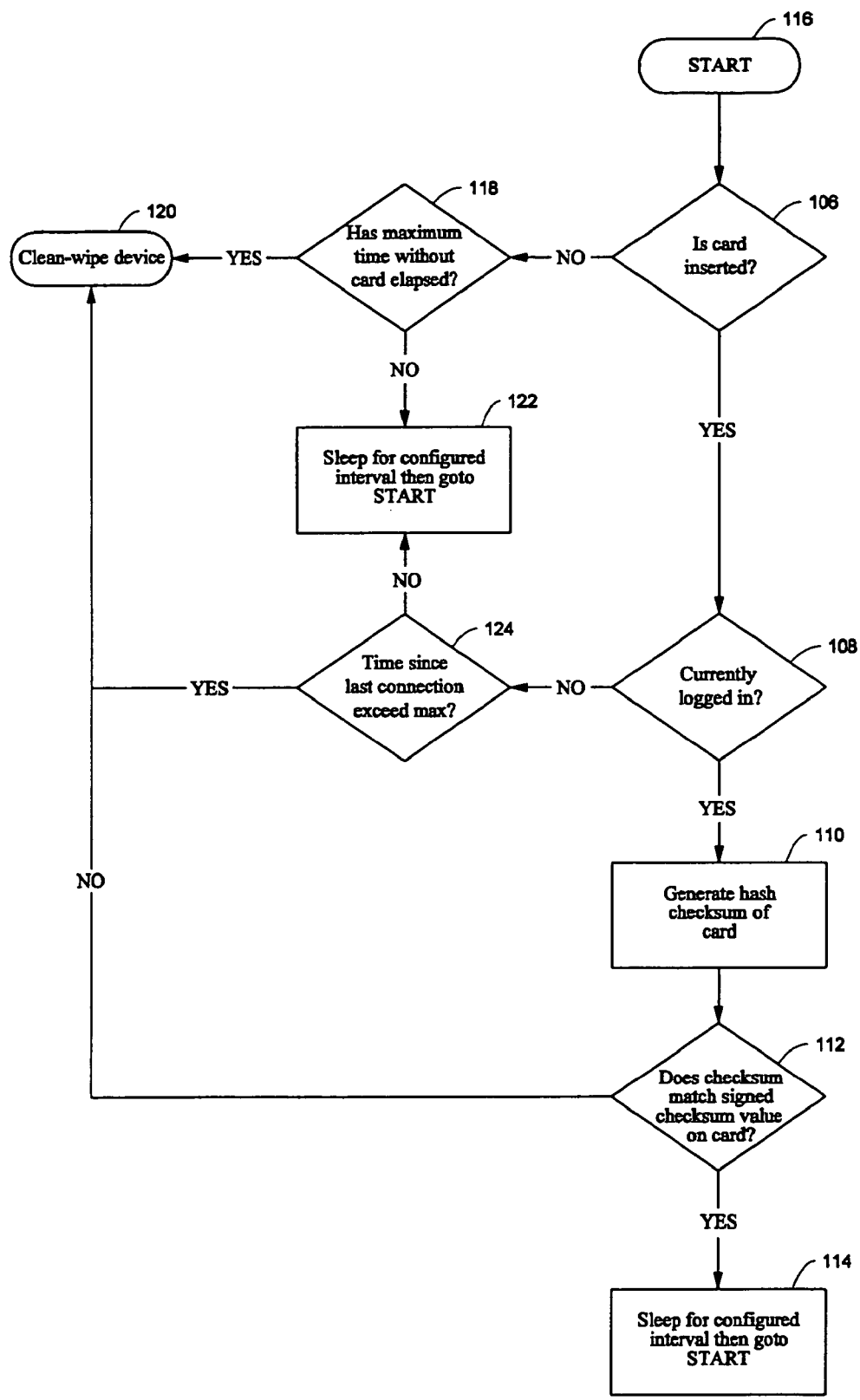
FIG. 6 illustrates an embodiment of security procedures utilized by software loaded on a mobile computing device.

FIG. 6 illustrates an embodiment of security procedures utilized by software loaded on the mobile computing device 12. At step 106 the process determines whether the medium 14 is inserted into the device 12. If the medium 14 is not inserted into the device 12, the process advances to step 108, where the process determines whether the user of the device 12 is currently logged in. If the user is logged in, the process advances to step 110, where a hash checksum of the medium 14 is generated. At step 112 the process determines whether the checksum generated at step 110 matches a checksum on the device 12. If the checksums match the process advances to step 114, where the device 12 goes inactive (i.e., "sleeps") for a predetermined time interval and then advances to start 116.

If the medium 14 is not inserted in the mobile computing device 12 as determined at step 106, the process determines at step 118 whether a maximum predetermined time has elapsed since the medium 14 has not been in the device 12. If the time has elapsed, the process advances to step 120, where the state of the device 12 is returned to its factory settings (i.e., the device 12 is "wiped"). If the time has not elapsed, the process advances to step 122, where the device 12 remains dormant (i.e., sleeps) for a predetermined interval before returning to start the process at 116.

If, at step 108, the mobile computing device 12 is not logged in, the process advances to step 124, where it is determined whether the time since the last connection of the device 12 has exceeded a maximum predetermined time. If the time has been exceeded, the device 12 is wiped at step 120. If the time has not been exceeded, the process advances to step 122 to wait for a predetermined time before advancing to start 116. If the checksums do not match as determined at step 112, the process advances to step 120 where the device 12 is wiped.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, digital versatile discs (DVD), optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be, for example and without limitation, either alone or in combination, a personal computer (PC), server-based computer, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein can include memory for storing certain software applications used in obtaining, processing, storing and/or communicating data. It can be appreciated that such memory can be internal or external, remote or local, with respect to its operatively associated computer or computer system. The memory can also include any means for storing software, including a hard disk, an optical disk, floppy disk, ROM (read only memory), RAM (random access memory), PROM (programmable ROM), EEPROM (extended erasable PROM), and other suitable computer-readable media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable for practice of various aspects of the present embodiments. However, because such elements are well known in the art, and because they do not facilitate a better understanding of the present invention, a discussion of such elements is not provided herein. It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It should be appreciated that figures presented herein are intended for illustrative purposes and are not intended as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

What is claimed is:

1. A system for securely personalizing a mobile computing device, comprising:
    a mobile computing device capable of wirelessly communicating via a data network; and
    an external data storage medium physically attached and inserted into the mobile computing device, the data storage medium having stored thereon software, a user profile for a user of the mobile computer device that identifies a network preference of the user, and preconfigured information, wherein the preconfigured information comprises security information that comprises an encryption key that enables the mobile computing device to authenticate the mobile computing device for communication via the data network with a server connected to the data network, and wherein software stored on the external data storage medium is installed on the mobile computing device after insertion of the external data storage medium in the mobile computing device for execution by the mobile computing device.

2. The system of claim 1, wherein the mobile computing device is pushed one or more software applications from the server after the mobile computing device is authenticated.

3. The system of claim 2, wherein the external data storage medium comprises a flash memory device.

4. The system of claim 3, wherein the mobile computing device comprises a handheld mobile computing device.

5. The system of claim 4, wherein the handheld mobile computing device comprises a mobile phone.

6. The system of claim 1, wherein the user profile stored on the external data storage medium comprises data that uniquely identifies the user to one or more servers of an enterprise.

7. The system of claim 6, wherein the user profile stored on the external data storage medium comprises address data for the one or more servers of the enterprise.

8. A method for securely personalizing a mobile computing device, the method comprising:
providing an external data storage medium for the mobile computing device to a user of the mobile computing device, the external storage medium having stored thereon software, a user profile for a user of the mobile computer device that identifies a network preference of the user, and preconfigured information, wherein the preconfigured information comprises security information that comprises an encryption key that enables the mobile computing device to authenticate the mobile computing device for communication via a data network with a server connected to the data network;
inserting the external data storage medium into the mobile computing device; and
upon insertion of the external data storage medium into the mobile computing device:
installing software stored on the external data storage medium on the mobile computing device for execution by the mobile computing device; and
communicating, by the mobile computing device, with the server via the data network.

9. The method of claim 8, further comprising receiving, by the mobile computing device, one or more software applications from the server via the data network after insertion of the external data storage medium into the mobile computing device and after the mobile computing device is authenticated.

10. The method of claim 8, wherein the external data storage medium comprises a flash memory device.

11. The method of claim 10, wherein the mobile computing device comprises a handheld mobile computing device.

12. The method of claim 11, wherein the handheld mobile computing device comprises a mobile phone.

13. The method of claim 8, wherein the user profile stored on the external data storage medium comprises data that uniquely identifies the user to one or more servers of an enterprise.

14. The method of claim 13, wherein the user profile stored on the external data storage medium comprises address data for the one or more servers of the enterprise.

15. A method for securely personalizing a mobile computing device, the method comprising:
receiving, by a user of the mobile computing device, an external data storage medium for the mobile computing device, the external storage medium having stored thereon software, a user profile for a user of the mobile computer device that identifies a network preference of the user, and preconfigured information, wherein the preconfigured information comprises security information that comprises an encryption key that enables the mobile computing device to authenticate the mobile computing device for communication via a data network with a server connected to the data network;
inserting the external data storage medium into the mobile computing device; and
upon insertion of the external data storage medium into the mobile computing device:
installing software stored on the external data storage medium on the mobile computing device for execution by the mobile computing device; and
communicating, by the mobile computing device, with the server via the data network.

16. The method of claim 15, further comprising installing, one or more software applications from the server via the data network after insertion of the external data storage medium into the mobile computing device and after the mobile computing device is authenticated.

17. The method of claim 15, wherein the external data storage medium comprises a flash memory device.

18. The method of claim 15, wherein the mobile computing device comprises a handheld mobile computing device.

19. The method of claim 18, wherein the handheld mobile computing device comprises a mobile phone.

20. The method of claim 15, wherein the user profile stored on the external data storage medium comprises data that uniquely identifies the user to one or more servers of an enterprise.

\* \* \* \* \*